United States Patent [19]
Moriarty et al.

[11] Patent Number: 5,993,751
[45] Date of Patent: Nov. 30, 1999

[54] PYROLIZER

[76] Inventors: Jack Moriarty, 35 Taylor Rd., Sheridan, Wyo. 82801; Bill Moriarty, 700 Fullerton, Buffalo, Wyo. 82834; Nathan Moriarty, 3741 Canyon Lake Rd., Rapid City, S. Dak. 57702

[21] Appl. No.: 09/088,946

[22] Filed: Jun. 2, 1998

[51] Int. Cl.⁶ .................................. C10B 1/00; B01J 8/00
[52] U.S. Cl. .................... 422/233; 422/235; 422/201; 202/118; 202/137; 202/150; 48/89; 48/119; 48/189.5
[58] Field of Search ..................... 422/201, 233, 422/235; 202/118, 137, 150; 48/89, 119, 189.5

[56] References Cited

U.S. PATENT DOCUMENTS

| | | | |
|---|---|---|---|
| 4,421,524 | 12/1983 | Chittick | 48/209 |
| 4,530,702 | 7/1985 | Fetters et al. | 48/209 |
| 4,597,772 | 7/1986 | Coffman | 48/111 |
| 4,778,585 | 10/1988 | Graff | 208/403 |
| 5,096,463 | 3/1992 | Beierle et al. | 48/76 |

*Primary Examiner*—Bekir L. Yildirim
*Attorney, Agent, or Firm*—Gene R. Woodle

[57] ABSTRACT

Embodiments of a pyrolizer are disclosed in which carbonaceous materials are pyrolyzed in a two stage process. In the first stage the materials are moved through a pretreater using augers and are heated to between 180 and 220 degrees C. In the second stage the materials are moved through a pyrolysis reactor using augers and are heated to between 500 and 1,100 degrees C.

8 Claims, 3 Drawing Sheets

PYROLIZER

BACKGROUND OF THE INVENTION

1. Field of the Invention

This invention relates generally to the processing of organic or carbon containing materials and more particularly to the pyrolization of such materials.

2. Background Information

Methods for the pyrolysis (sometimes referred to as carbonization) of organic materials such as coal is widely known. Pyrolysis is generally the process of converting organic materials including wood chips, sawdust, coal, and straw into more useful products such as charcoal and fuel. In most cases pyrolysis is accomplished by heating the organic material to from about 500 degrees C to 1,500 degrees C. This leaves a solid carbonaceous residue known as char or, depending upon the material, charcoal and produces gaseous and liquid products. The gases produced include carbon monoxide and hydrogen. The liquids include water, various aromatics and heterocyclics.

There are a number of problems relating to known methods of pyrolysis. In most instances, one of the byproducts of pyrolysis are a variety of tars which are not useful and tend to clog the reactor. Because pyrolysis involves heating the organic material to relatively high temperatures, the process and equipment tend to be fairly expensive. The high cost of transporting raw materials are an additional problem for pyrolyzers which are not mobile.

The various problems relating to pyrolysis have been addressed with some success in a number of patented inventions. The following patents are illustrative of the types of processes and equipment which have been tried.

A method for converting carbon containing materials such as straw or sawdust into fuel is disclosed in the patent to Chittick (U.S. Pat. No. 4,421,524; Dec. 20, 1983). One part of this fairly complicated process includes a pyrolysis reactor. Two embodiments of the pyrolysis reactor are shown. One embodiment includes a vertical cylinder with a cellulose intake at the top and an ash and gas outlet at the bottom. The reactor is loaded for most of its length with charcoal. The cylinder is surrounded with a heating jacket that heats the charcoal to the reaction temperature and the cellulose is introduced into the top. There is a stirring rod which goes down through he middle of the reactor. Paddles attached to the rod stir the mixture when a wheel on the top of the reactor is turned. In a second embodiment, material is pumped up through the bottom of the reactor.

A two stage pyrolysis process of coal for producing liquid hydrocarbon fuels is disclosed in the patent to Graff (U.S. Pat. No. 4,778,585; Oct. 18, 1988). This process includes a two steps for pyrolysis of coal. Coal is introduced into a pretreater in which it is heated to between 280 degrees C and 370 degrees C at a pressure of from 1 to 100 atmospheres. The product is transferred to a pyrolyzer where it is heated to between 600 degrees C and 800 degrees C at a pressure of from 1 to 100 atmospheres. In both cases the material is described as being treated by passing a heated gas such as steam through a bed of the material.

Another method for producing fuel gas from organic material is disclosed in the patent to Fetters (U.S. Pat. No. 4,530,702; Jul. 23, 1985). Although there are a number of embodiments described in the patent, this invention generally includes a vertical cylinder which is open at the top and which has a screen across the bottom. The bottom of the cylinder above the screen is filled to about ⅔ full with charcoal pellets. These pellets may come from a third party source or from previous operation of the pyrolizer. The charcoal pellets are burned until the unit reaches operating temperature and then raw pellets are introduced from a hopper onto the top of the charcoal pellets. In one embodiment there is an exit tube beneath the screen through which ash and gases are pumped through a filter. The pump pulls air down through the top of the cylinder. There are other embodiments which are similar including one in which the air is pumped through the bottom of the cylinder and the gases are removed above the screen.

Although the above described inventions address problems relating to pyrolization, none of them solve a number of other problems. All of these processes provide for a relatively stable bed of material which leads to the buildup of tars and other unwanted materials and provides for poor material transport. In addition, the use of a static bed provides for a relatively small reaction area or zone.

The instant invention is a pyrolizer which is unique, original, and fills the need for a new and improved method of pyrolyzing organic materials. The pyrolizer of the instant invention provides energy efficiency which is unknown in the prior art. The pyrolizer of the instant invention also provides for material transport which is significantly improved over known prior art and for a much larger reaction area or zone. The pyrolizer of the instant invention is also mobile.

In many cases a producer or manufacturer requires or desires char or charcoal having a particular composition. For example, a manufacturer may desire char which has a low ash content, low moisture content, high volatile content, and a medium carbon content. Another manufacturer may desire char having a different composition such as high ash content, low moisture, very low volatile content, and very high carbon content.

The ideal pyrolizer affects pyrolysis in a manner which produces the greatest percentages of useful products. The ideal pyrolizer should also accomplish pyrolysis in the most energy efficient manner. The ideal pyrolizer should also create the largest possible reaction area or zone to promote the desired reactions. The ideal pyrolizer should also be mobile and provide for efficient transfer of material through the reactor. The ideal pyrolizer should be able to provide char or charcoal having various compositions or specifications and to provide these varying specifications with relative ease and high accuracy. The ideal pyrolizer should also be simple to operate, durable, compact, and inexpensive.

SUMMARY OF THE INVENTION

The pyrolizer of the instant invention accomplishes pyrolysis in a two stage process, pretreating and pyrolization.

A variety of raw materials including wood chips, coal, or nearly any solid organic material are loaded into a hopper which is directly above the intake of the pretreater. The pretreater is a hollow cylinder with an intake cap on the end beneath the hopper and an outlet cap on the opposite end. There are a plurality of material tubes inside the pretreater which run the length of the main body of the pretreater and an equal number of augers inside the material tubes. There is a gear box on the intake cap and a motor attached to the gear box drives the augers. Material from the hopper falls through a material intake into the intake cap and is driven by the augers through the material tubes toward the outlet cap. A burner outside the pretreater heats a gas such as air to a temperature of approximately 200 degrees C and the gas is introduced into the outlet cap of the pretreater through a heat intake. The heated gas is not in communication with the interior of the material tubes, but flows around the material tubes inside the pretreater and heats the material to approximately 200 degrees C. By heating the material, most of the moisture and some of the volatiles are driven from the material. The material tubes are in communication with a stack attached to the outlet cap. Gases from the stack are recycled through the burner and supply at least some of the fuel necessary to power the burner. Material is forced from the material tubes by the augers and the material drops into the outlet cap and out a material outlet at the bottom of the outlet cap.

The second stage, the pyrolization reactor, is identical to the pretreater except that it is mounted beneath the pretreater and material inters the pyrolization reactor through the pyrolization intake from the material outlet of the pretreater. In the pyrolization reactor the material is heated to approximately 900 degrees C rather than 200 degrees C. This drives off the remaining moisture in the material and 10 to 90 percent of the volatile matter within the material.

By adjusting the operating temperatures in the pretreater and the pyrolization reactor and by adjusting the speed of the augers and the flow rate of the material, the composition of the char or charcoal and other byproducts may be varied. Depending upon the desired result the pyrolization reactor may be operated at between 200 degrees C and 1,100 degrees C.

In the patents discussed above, the focus of the pyrolization is the fuel which is produced and the char or charcoal is largely considered a waste material. In the instant invention, the char or charcoal is the most desirable product and is ordinarily used to produce high quality activated charcoal. However, in most cases, more than enough fuel will be produced by the instant invention to run the burners; and excess fuel could be used for other purposes. Although the main purpose of the instant invention is to produce high quality char or charcoal, the invention could also be used for other purposes including remediation of soil or other materials contaminated by oil or other organic material.

The use of two stages is believed to improve efficiency by driving off the majority of the moisture in the material at a lower temperature than is usually used for pyrolysis. In known prior art inventions material moves through the reactor at a much slower rate than in the auger driven process of the instant invention. The instant invention is also believed to allow a much faster rate of pyrolization than known prior art, because the reaction area or zone is much greater than in known prior art invention. In addition, the instant invention allows for a much wider variety of output composition than known prior art because of the ability to easily adjust operating temperatures and flow rates.

One of the major objects of the present invention is to provide a pyrolizer which accomplishes pyrolysis in a manner which produces the greatest percentages of useful products.

Another objective of the present invention is to provide a pyrolizer which accomplishes pyrolysis in the most energy efficient manner.

Another objective of the present invention is to provide a pyrolizer which creates the largest possible reaction area or zone to promote the desired reactions.

Another objective of the present invention is to create a pyrolizer which is mobile and provides for efficient transfer of material through the reactor.

Another objective of the present invention is to create a pyrolizer which is able to provide char or charcoal having various compositions or specifications and to provide these varying specifications with relative ease and high accuracy.

Another objective of the present invention is to provide a pyrolizer which is simple to operate, durable, compact, and inexpensive.

These and other features of the invention will become apparent when taken in consideration with the following detailed description and the drawings.

DESCRIPTION OF A PREFERRED EMBODIMENT

Figure 1:
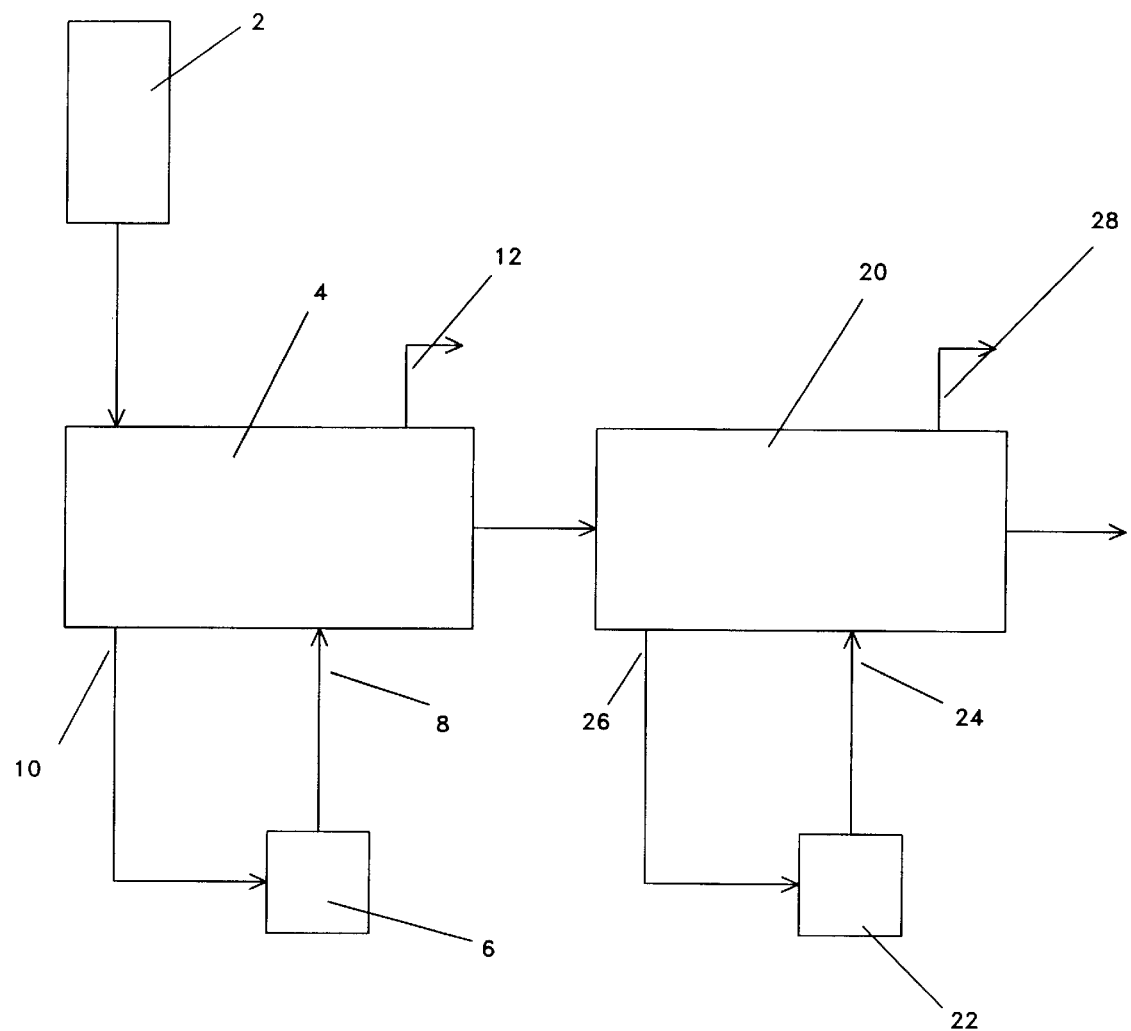
FIG. 1 is a block diagram showing a preferred form of the process accomplished by the pyrolizer of the present invention.

Referring to the drawings, FIGS. 1 through 5, there is shown a preferred form of the pyrolizer embodying the present invention.

Referring to FIG. 1, a block diagram of a pyrolizer of the present invention is shown. Any of a variety of raw materials including wood chips, coal, or nearly any solid organic material are loaded into a hopper 2 and gravity fed from the hopper 2 to a pretreater 4. The materials are heated in the pretreater 4 by a pretreater burner 6 to a temperature sufficient to drive off most of the water in the materials and some of the other volatile matter. In the preferred embodiment of the instant invention this temperature is approximately 200 degrees C, but a fairly wide range of temperatures could be used depending upon the materials and the flow rate. The burner 6 heats air which enters the pretreater 4 through a pretreater air inlet 8 and flows counter current to the flow of the materials. In the preferred embodiment of the instant invention said burner 6 is powered by propane. The hot air exits said pretreater 4 through a pretreater air outlet 10 and is vented to the atmosphere. Volatiles exit said pretreater through a pretreater stack 12 and are transferred to said burner 6 where they supplement the propane. Other fluids or gases could be used in place of the air and fuels other than propane could also be used. Water, for example, could be used instead of air. If so, the water would be heated until it was steam by said burner 6 and after the steam leaves said pretreater air outlet 10 would be recycled rather than vented.

Still referring to FIG. 1, pretreated materials move from said pretreater 4 to a pyrolization reactor 20. The pyrolization reactor 20 works in much the same manner as said pretreater 4 except that the materials are heated from approximately 200 degrees C to approximately 1,100 degrees C by a pyrolization burner 22. The propane fired pyrolization burner 22 heats air which enters the pyrolization reactor 20 through a pyrolization air inlet 24 and the hot air flows through said pyrolization reactor 20 counter current to the material flow. The hot air exits said pyrolization reactor 20 through a pyrolization air outlet 26 and is vented to the atmosphere. Moisture and other volatiles from the material exit said pyrolization reactor 20 through a pyrolization stack 28 and are used to fire the pyrolization reactor burner 22. Again, other fluids or gases could be used in place of the air and fuels other than propane could also be used. Water, for example, could be used instead of air. If so, the water would be heated until it was steam by said pyrolization burner 22 and after the steam leaves said pyrolization air outlet 26 would be recycled rather than vented.

Still referring to FIG. 1, the pyrolizer of the instant invention removes nearly all of the moisture in the feed material and also removes 10 to 90 percent of the volatile matter in the feed material. By using the two stage process, said pretreater 4 and said pyrolization reactor 20, the instant invention is much more efficient and uses less fuel than known prior art inventions. The various elements of the instant invention are described in detail below.

Figure 2:
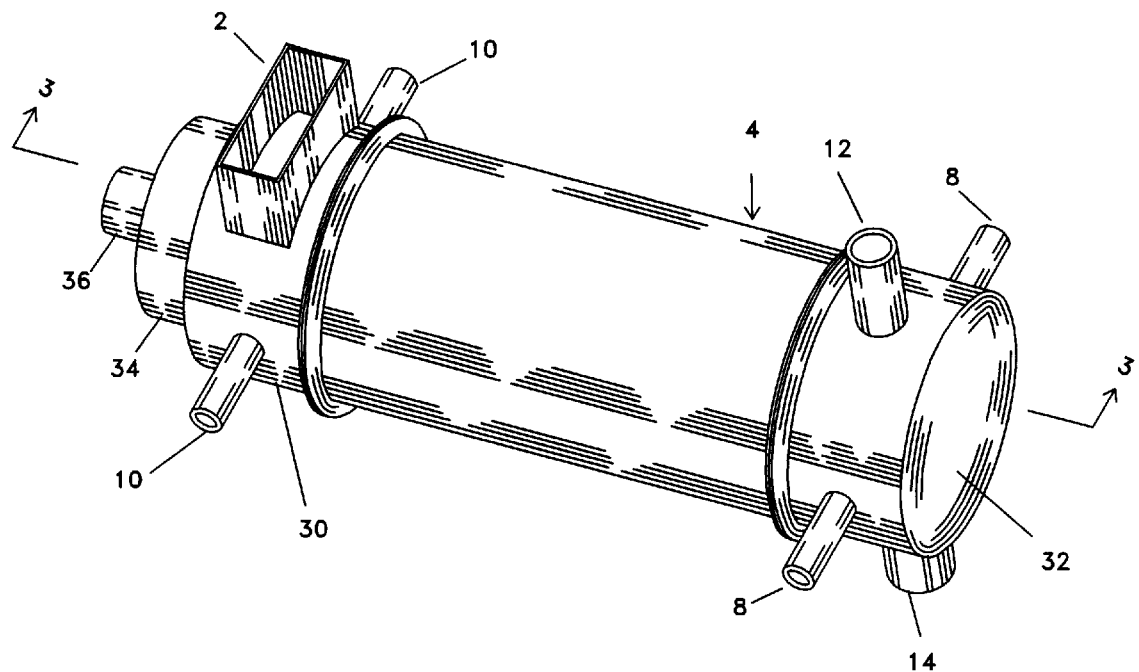
FIG. 2 is a perspective view of the pretreater portion of the pyrolizer of the present invention.

Referring now to FIG. 2, a perspective view of said pretreater 4 portion of the pyrolizer of the present invention is shown. Said pretreater 4 has the general shape of a hollow cylinder with an intake cap 30 on the end connected to said hopper 2. There are two of said pretreater air outlets 10 in the intake cap 30. There is an outlet cap 32 on the other end of said pretreater 4. There are two of said pretreater air inlets 8 on the outlet cap 32. Said pretreater stack 12 is also on the outlet cap 32. There is a gear box 34 on the end of said intake cap 30 and a motor 36 attached to the gear box 34. The discharge from said pretreater 4 is through the pretreater outlet 14 in the bottom of said outlet cap 32.

Figure 3:
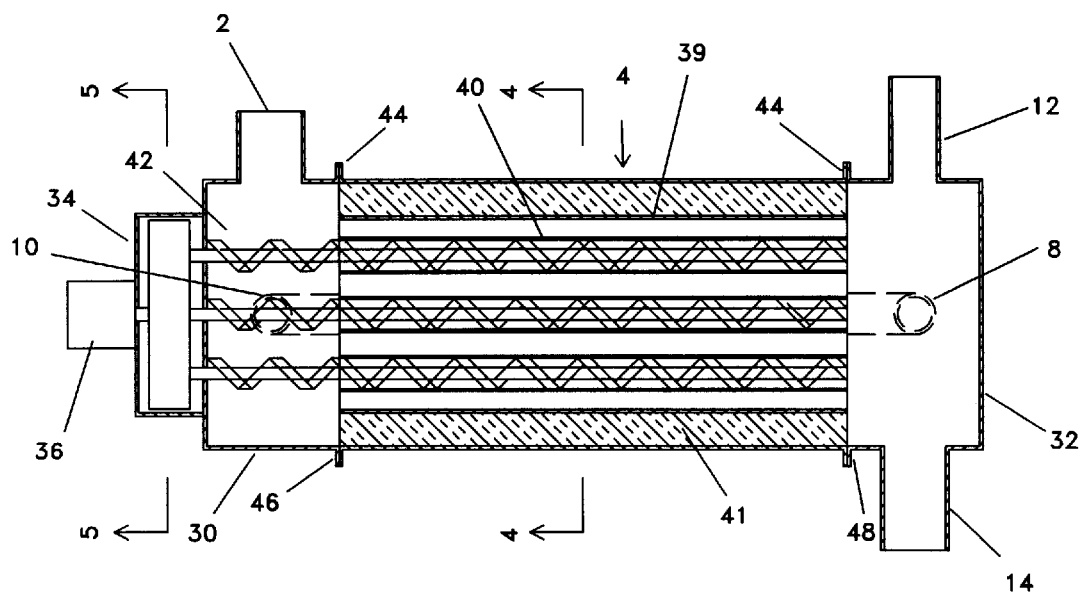
FIG. 3 is a sectional view of the pretreater portion of the present invention taken along line 3—3 of FIG. 2.

Referring now to FIG. 3, a sectional view of said pretreater 4 portion of the pyrolizer taken along line 3—3 of FIG. 2 is shown. There is a pretreater insulation tube 39 inside said pretreater 4 which runs form the inside edge of said intake cap 30 to the inside edge of said outlet cap 32 and has the same longitudinal axis as said pretreater 4. There are a plurality of material tubes 40 within said pretreater 4 and within the pretreater insulation tube 39 which runs from the inside edge of said inlet cap 30 to the inside edge of said outlet cap 32. The longitudinal axes of the material tubes 40 are parallel to the longitudinal axis of said pretreater 4 and said material tubes 40 are not in contact with either the inner wall of said pretreater insulation tube 39 or each other. There is pretreater insulation 41 between the outside surface of said pretreater insulation tube 39 and the inside surface of said pretreater 4 to lower heat transfer from the inside of said pretreater insulation tube 39 to the outside atmosphere. There is a plurality of augers 42 equal in number to said material tubes 40 inside said material tubes 40. The augers 42 run from a point near the outside edge of said inlet cap 30 to the inside edge of said outlet cap 32. The motor 36 drives gears in the gear box 34 which cause said augers to turn. Material from said hopper 2 drops into said inlet cap 30 where it is pushed through said material tubes 40 by said augers 42 and drops into said outlet cap 32. Hot air flowing in through said pretreater air inlets 8 heats the material to approximately 200 degrees C and then flows out through said pretreater air outlets 10. The material then flows from said pretreater 4 through said pretreater outlet 14 into said pyrolization reactor 20. The hot air flowing through said pretreater 4 is in communication with the interior the body of said pretreater 4; but is not in communication with said material tubes 40 or the interior of said inlet cap 30 or said outlet cap 32. The interior of said material tubes 40 is in communication with said pretreater stack 12; and volatiles and other gases from the material flow through said pretreater stack 12 and are transported to power said pretreater burner 6 (not shown in FIG. 3). There are flanges 40 on the ends of the body of said pretreater 4. There is also a flange 46 and a flange 48 on the inside edges of said inlet cap 30 and said outlet cap 32 respectively. These flanges are used to removably attach said inlet cap 30 and said outlet cap 32 to the body of said pretreater 4.

Figure 4:
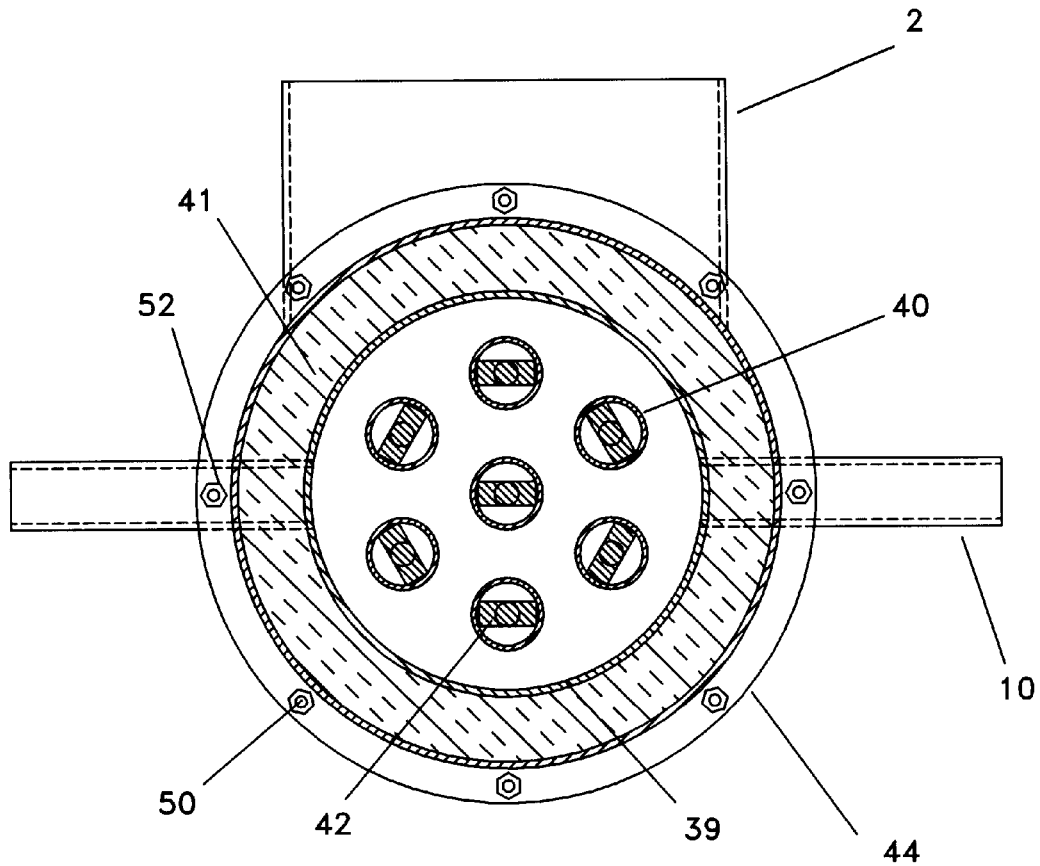
FIG. 4 is a sectional view of the pretreater portion of the present invention taken along line 4—4 of FIG. 3.

Referring now to FIG. 4, a sectional view of the pyrolizer of the instant invention is shown taken along line 4—4 of FIG. 3. Said material tubes 40 are evenly spaced throughout the interior of said pretreater 4 to provide for optimum heat transfer. There is a series of holes 50 through said flanges 44, 46, and 48; and said inlet cap 30 and said outlet cap 32 are attached to the body of said pretreater 4 by an equal number of nuts and bolts 52. Said pretreater air inlets 8 and said pretreater air outlets 10 are in communication with the space inside said pretreater insulation tube 39 and outside said material tubes 40; but are not in communication with the interior of said material tubes 40.

Figure 5:
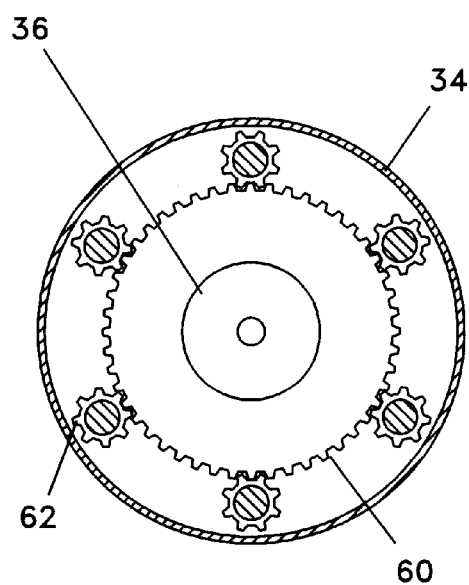
FIG. 5 is a a sectional view of the pretreater portion of the present invention taken along line 5—5 of FIG. 3.

Referring now to FIG. 5, a sectional view of the pyrolizer of the instant invention taken along line 5—5 of FIG. 3 is shown. Said motor 36 turns a large gear 60 inside said gear box 34. The large gear 60 turns a plurality of small gears 62 equal in number to the number of said augers 42. The turning of the small gears 62 causes the turning of said augers 42. Although a gear system is shown; other means for driving said augers 42 including drive chains could be used.

Said pyrolization reactor 20 is not shown as it is identical in configuration to said pretreater 4. Said pyrolization reactor 20 is mounted below said pretreater 4 such that material from said pretreater 4 drops into said pyrolization reactor 20. Said pyrolization reactor operates in the same manner as said pretreater except that the material is heated to approximately 900 degrees C rather than 200 degrees C.

The basic purpose of the pyrolizer of the instant invention is to prepare organic materials for further processing into activated charcoal. However, the pyrolizer could be used for a variety of other purposes including the creation of fuel from organic materials. The pyrolizer could also be used for remediation of soil contaminated by oil or other organic materials.

In the preferred embodiment of the pyrolizer all components are made of steel, but other materials having sufficient strength, corrosion resistance, and heat resistance could be used. The inside surface of the body of said pretreater 4 and said pyrolization reactor 20 are lined with heat and corrosion resistant material. Said augers 42, said motor 36, and said gear box 34 are conventional.

In the preferred embodiment of this invention, various elements including said pretreater 4, said inlet cap 30, and said outlet cap 32 are shown and described as being cylindrical; but other shapes could be used. The temperature in said pretreater 4 and said pyrolization reactor 20 are described at approximately 200 degrees C and 900 degrees C respectively; but it may be that other temperatures would be more optimal depending upon the material used and the use to which the instant invention is to be put.

As previously mentioned, it is desirable to be able to produce char of charcoal and other byproducts having various compositions. The pyrolizer of the instant invention is capable of producing this result. Although there is an almost infinite variety of compositions of char or charcoal and byproduct compositions possible; two examples are provided. If, for example, it were desired to produce char having 1–5% ash, 0–2% moisture, 20–35% volatiles, and 40–55% carbon; the pyrolization reactor would be operated at between 450 degrees C and 550 degrees C. If char having 2.5–6% ash, 02–04% moisture, 1–5% volatiles, and approximately 93% carbon were desired; the pyrolization reactor would be operated at between 725 degrees C and 1010 degrees C. Depending upon the desired result, the pyrolization reactor could be operated at a range of between 200 degrees C and 1,100 degrees C.

While preferred embodiments of this invention have been shown and described above, it will be apparent to those skilled in the art that various modifications may be made in these embodiments without departing from the spirit of the present invention. For that reason, the scope of the invention is set forth in the following claims:

I claim:

1. A material processor comprising:
   (1) a hollow body having an inlet end and an outlet end and having a longitudinal axis;
   (2) a plurality of tubes suspended within the hollow body such that longitudinal axes of the tubes are parallel to the longitudinal axis of said hollow body and said tubes arc neither in communication with the interior of said hollow body nor with each other;
   (3) a series of augers equal in number to the number of said tubes and the augers being inside said tubes and capable of pushing material through said tubes;
   (4) means for introducing material into said tubes at the inlet end of said hollow body such that the material may be pushed through said tubes by said augers;
   (5) means for turning said augers such that said augers may push material through said tubes;
   (6) means for heating or cooling the interior of said hollow body such that the material within said tubes are heated or cooled to a desired temperature; and
   (7) means for removing the material from said tubes at the outlet end of said hollow body:
   whereby a material to be processed may be introduced into said tubes, driven through said tubes by said augers, and heated or cooled to a desired temperature.

2. The material processor of claim 1 in which air is heated by a burner and the hot air is introduced into the interior of said hollow body at one end of said hollow body and the hot air exits said hollow body at the other end of said hollow body.

3. The material processor of claim 1 in which any volatile matter within the material is vented through a stack in the outlet end of said hollow body.

4. The material processor of claim 2 in which any volatile matter within the material is vented through a stack in the outlet end of said hollow body and the volatile matter is used to fire said burner.

5. A device for the pyrolization of carbonaceous material comprising:
   (1) a pretreater having an inlet end and an outlet end and having a longitudinal axis;
   (2) a plurality of tubes suspended within the pretreater such that longitudinal axes of the tubes are parallel to the longitudinal axis of said pretreater and said tubes are neither in communication with the interior of said pretreater nor with each other;
   (3) a series of augers equal in number to the number of said tubes and the augers being inside said tubes and capable of pushing material through said tubes;
   (4) means for introducing material into said tubes at the inlet end of said pretreater such that the material may be pushed through said tubes by said augers;
   (5) means for turning said augers such that said augers may push material through said tubes;
   (6) means for heating the interior of said pretreater such that the material within said tubes is heated to a temperature sufficient to drive off moisture from the material;
   (7) a pyrolization reactor having an inlet end and an outlet end and having a longitudinal axis;
   (8) a plurality of pyrolization tubes suspended within the pyrolization reactor such that longitudinal axes of the pyrolization tubes are parallel to the longitudinal axis of said pyrolization reactor and said pyrolization tubes are neither in communication with the interior of said pyrolization reactor nor with each other;
   (9) a series of pyrolization augers equal in number to the number of said pyrolization tubes and the pyrolization augers being inside said pyrolization tubes and capable of pushing material through said pyrolization tubes;
   (10) means for introducing material from said pretreater at the outlet end of said pretreater into the pyrolization tubes of said pyrolization reactor such that the material may be pushed through said pyrolization tubes by said pyrolization augers;
   (11) means for turning said pyrolization augers such that said pyrolization augers may push material through said pyrolization tubes;
   (12) means for heating the interior of said pyrolization reactor such that the material within said pyrolization tubes is heated to a temperature sufficient to cause the desired degree of pyrolization of the material; and
   (13) means for recovering char or charcoal from said pyrolization reactor; whereby carbonaceous material may be pyrolyzed in a two stage process in which the material is first heated to a temperature sufficient to drive off moisture from the material and then heated to a temperature sufficient to cause the desired degree of pyrolization of the material.

6. The device in claim 5 in which volatiles from the material are vented from the outlet end of said pretreater and are used, at least partially, to heat the material within said pretreater.

7. The device in claim 5 in which volatiles from the material are vented from the outlet end of said pyrolysis reactor and are used, at least partially, to heat the material within said pyrolysis reactor.

8. The device in claim 5 in which volatiles from the material are vented from the outlet end of said pretreater and from the outlet end of said pyrolysis reactor and are used, at least partially, to heat the material within said pretreater and said pyrolysis reactor.

* * * * *